(12) United States Patent
Nyberg et al.

(10) Patent No.: US 7,809,986 B2
(45) Date of Patent: Oct. 5, 2010

(54) FAULT DIAGNOSIS

(75) Inventors: Mattias Nyberg, Tullinge (SE); Jonas Biteus, Linköping (SE); Erik Frisk, Linköping (SE); Jan Åslund, Linköping (SE)

(73) Assignee: Scania CV AB, Sodertalje (SE)

( * ) Notice: Subject to any disclaimer, the term of this patent is extended or adjusted under 35 U.S.C. 154(b) by 535 days.

(21) Appl. No.: 11/765,132

(22) Filed: Jun. 19, 2007

(65) Prior Publication Data

US 2008/0052559 A1 Feb. 28, 2008

(30) Foreign Application Priority Data

Aug. 22, 2006 (SE) ................... 0601715

(51) Int. Cl.
*G06F 11/00* (2006.01)
(52) U.S. Cl. ............ 714/26; 714/33; 702/183; 702/184
(58) Field of Classification Search ............ 714/26, 714/33, 47; 702/182–185
See application file for complete search history.

(56) References Cited

U.S. PATENT DOCUMENTS

| | | | |
|---|---|---|---|
| 5,544,308 A | 8/1996 | Giordano et al. | |
| 5,631,831 A | 5/1997 | Bird et al. | |
| 5,922,079 A | 7/1999 | Booth et al. | |
| 6,622,264 B1 | 9/2003 | Bliley et al. | |
| 6,983,200 B2 | 1/2006 | Bodin et al. | |
| 7,012,512 B2 | 3/2006 | St. Denis | |
| 7,039,507 B2 * | 5/2006 | Hagenbuch | 701/29 |
| 7,085,680 B2 * | 8/2006 | Huang | 702/183 |
| 7,529,643 B2 * | 5/2009 | Nyberg | 702/182 |
| 7,577,548 B1 * | 8/2009 | Przytula et al. | 702/182 |

FOREIGN PATENT DOCUMENTS

| | | |
|---|---|---|
| EP | 1356996 A2 | 10/2003 |
| EP | 1136912 B1 | 11/2004 |
| JP | 2004151021 A | 5/2004 |
| WO | WO02/054654 A2 | 7/2002 |

OTHER PUBLICATIONS

Dekleer, J. and Williams, B.C.; Diagnosing Multiple Faults; Artificial Intelligence; 1987; pp. 97-130; Issue 1, vol. 32; Elsevier Science Publishers B.V., North-Holland.

(Continued)

*Primary Examiner*—Philip Guyton
(74) *Attorney, Agent, or Firm*—Moore & Van Allen PLLC; W. Kevin Ransom (57) ABSTRACT

Health statuses of components expressing a normal, a suspected faulty or a confirmed faulty condition are estimated. Based on results of tests minimal conflicts are identified explaining the test results. Readiness statuses are derived indicating a final value or a non-final value depending on whether or not additional testing of a component is expected to alter the component's health status. In case of non-final value[s], future minimal conflicts are identified expressing all combinations of potentially faulty components being consistent with the set of present minimal conflicts. Based on the minimal conflicts, additional tests are determined being potentially capable of producing results that cause the readiness status to be changed to the final value for one or more components. A status report is generated after evaluation of at least one of the additional tests.

14 Claims, 2 Drawing Sheets

OTHER PUBLICATIONS

Reiter, R.; A Theory of Diagnosis from First Principles; Artificial Intelligence, Apr. 1987; pp. 57-95; Issue 1, vol. 32; Elsevier Science Publishers B.V., North-Holland.

Nyberg, Mattias and Krysander, Mattias; Combining AI, FDI, and Statistical Hypothesis-Testing in a Framework for Diagnosis; Proceedings of IFAC Safe Process '03; 2003; Washington, USA.

* cited by examiner

Fig. 3

FAULT DIAGNOSIS

THE BACKGROUND OF THE INVENTION AND PRIOR ART

The present invention relates generally to diagnosing complex systems and devices including a large number of parts and components.

As today's technical systems generally become increasingly complex, efficient monitoring and detection of malfunctioning components is an area that gains progressive importance. Fault diagnosis algorithms may be applied to determine why an entity does not behave as intended. Typically, diagnosing the entity means selecting a subset of a predetermined set of causes responsible for the entity's incorrect behavior. A diagnosis should both explain the incorrect behavior and optimize some objective function, such as probability of correctness or cost of incorrect diagnosis. The need to diagnose is a common reason to measure or to test the entity. It is assumed that the entity consists of a finite number of diagnosed components. Further, failures of the entity are caused only by faults in at least one of these components.

In the artificial intelligence (AI) discipline, so-called consistency based diagnosis is the dominant methodology for fault isolation. This approach is strongly related to the methods for fault isolation used in fault detection and isolation (FDI), e.g. described in the article Nyberg, M. et al., "Combining AI, FDI, and statistical hypothesis testing in a framework for diagnosis", *Proceedings of IFAC Safe process '03*, Washington, U.S.A., 2003.

A consistency based diagnosis points at one set of components whose abnormal behavior could explain why a system does not function as intended, and a set of diagnoses points at different such possible sets of components. However, the existing tools sometimes provide unclear conclusions regarding exactly which components that certainly are faulty, respective which components that are only suspected to be faulty, or normal. Nevertheless, this type of information would be useful, especially for a repair technician. Moreover, the known diagnostic systems lack indicators as to whether or not evaluation of additional test results would provide a more reliable diagnosis of the tested entity and its components. Hence, in today's solutions, it is unknown if a particular component has already been tested enough to determine a best possible estimate of its health status.

The term readiness is referred to in some prior art references, for instance EP 1 356 996 and JP 2004/151021. Here, the readiness status relates to single-component diagnostic tests, and designates whether or not the diagnosis system has yet had the opportunity to test a particular parameter or component. As soon as the relevant test has been completed, a ready status is assigned. Consequently, multiple-component diagnostic tests, wherein evaluation of several tests in respect of one component may be required cannot be handled.

Modern automotive vehicles often include a diagnostic system, which stores a diagnostic trouble code (DTC) when a component is found to be faulty. In the first generations of vehicular diagnostic systems, each diagnostic test checked exactly one component for faulty behavior. The DTCs could therefore be used to state exactly which components that where faulty and which components that where normal respectively. Recently, e.g. regulatory demands for reduced emission levels, have required introduction of diagnostic tests that simultaneously check the behavior of several components, i.e. multi-component tests or so-called plausibility tests. These general type of tests, e.g. being based on analytical redundancy relations (ARR), may come into conflict with the diagnostic framework that is based on the previously used single component tests.

From a DTC point-of-view, multi-component tests are problematic, since they can result in a non-binary component status, typically including a level between the normal and the faulty statuses that reflects a suspected fault status for one or more components. It therefore becomes unclear whether or not a suspected fault status should result in a DTC being set for the relevant components.

Modern automotive vehicles often include a number of electronic control units (ECUs), or agents. These units communicate over a network, and thus represent a distributed system. In such a system, a diagnostic test in one agent may check components that are physically and/or logically controlled by another agent. In this context, the agents may exchange information like sensor values, actuator values and calculated values. The multi-component tests should also be capable of handling this type of data streams.

SUMMARY OF THE INVENTION

The object of the present invention is to solve the above problems and thus present a solution, which provides improved reliability indicators in respect of the generated diagnoses. It is also an object of the invention to specify whether any further test evaluation in respect of the entity and its components is meaningful.

According to one aspect of the invention, the object is achieved by the initially described diagnosis engine, wherein the status report indicates the health status in the form of a parameter expressing whether the component is normal, suspected faulty or confirmed faulty. Moreover, the processing unit is adapted to associate a readiness status with each component to be tested in the entity. The readiness status for a component indicates a final value if no additional testing of the component is expected to alter the component's present health status. However, if additional testing of the component may produce test results that alter the component's present health status, the readiness status indicates a non-final value. Based on the received test results, the processing unit is adapted to identify a set of present minimal conflicts defining a set of health statuses for the components that explain the test results. Moreover, the processing unit is adapted to identify a respective readiness status for each of the components. If at least one non-final value is obtained, the processing unit is adapted to identify a set of future minimal conflicts expressing all potential combinations of health statuses for the components being consistent with the set of present minimal conflicts. Thereafter, based on the sets of present and future minimal conflicts, the processing unit is adapted to determine a set of additional tests. Here, each test is potentially capable of producing a result that causes the processing unit to change the readiness status for at least one of the components from the non-final value to the final value. The processing unit is also adapted to evaluate at least one test in the set of additional tests.

An important advantage by this diagnosis engine is that each derived health status is associated with a reliability indicator expressing how certain the estimated status is. Naturally, this is key information to any service personnel being involved in the service and maintenance of the entity.

According to one embodiment of this aspect of the invention, the processing unit is adapted to evaluate different tests in the set of additional tests until a readiness status with a final value has been derived in respect of a desired number of the components. Hence, a test evaluation being as complete as possible, or necessary, is guaranteed.

According to another embodiment of this aspect of the invention, the processing unit is adapted to receive the test results via at least two testing agents associated with the entity. The at least two testing agents, in turn, are included in a distributed testing system for the entity, e.g. including a number of ECUs.

According to yet another embodiment of this aspect of the invention, at least one test in the set of tests is a multi-component test adapted to simultaneously check a behavior of at least two of said components. Consequently, complex diagnostic tests can be employed.

According to another aspect of the invention, the object is achieved by the motor vehicle described initially, wherein the diagnosis system includes the above-proposed diagnosis engine.

According to another aspect of the invention, the object is achieved by the method described initially, wherein the status report indicates the health status in the form of a parameter expressing whether the component is normal, suspected faulty or confirmed faulty. The method involves associating a readiness status with each of the components. The readiness status for a component indicates a final value, if no additional testing of the component is expected to alter the component's present health status. Nevertheless, if additional testing of the component may produce test results that alter the component's present health status, the readiness status indicates a non-final value. Further, based on the received test results, the method involves identifying a set of present minimal conflicts defining a set of health statuses for the components that explain the test results. Moreover, a respective readiness status is derived for each of the components. If at least one non-final value is obtained, a set of future minimal conflicts is identified, which expresses all potential combinations of health statuses for the components being consistent with the set of present minimal conflicts. Then, based on the sets of present and future minimal conflicts, a set of additional tests is determined. Here, each test is potentially capable of producing a result that causes the readiness status one or more of the components to be changed from the non-final value to the final value. At least one test in the set of additional tests is also evaluated.

The advantages of this method, as well as the preferred embodiments thereof, are apparent from the discussion hereinabove with reference to the proposed diagnosis engine.

According to a further aspect of the invention the object is achieved by a computer program product directly loadable into the internal memory of a computer, comprising software for controlling the above proposed method when said program is run on a computer.

According to another aspect of the invention the object is achieved by a computer readable medium, having a program recorded thereon, where the program is to make at least one computer control the above proposed method.

The present invention is useful because it enables an optimal estimation of the health status of each component that is included in an entity, such as a vehicle. The invention also allows determination of each component's readiness, i.e. whether any additional testing of the component is meaningful to further evaluate its status. Consequently, the diagnosing procedure also becomes efficient with respect to required processing resources, since unnecessary test evaluation can be avoided.

BRIEF DESCRIPTION OF THE DRAWINGS

The present invention is now to be explained more closely by means of embodiments, which are disclosed as examples, and with reference to the attached drawings.

DESCRIPTION OF EMBODIMENTS OF THE INVENTION

Figure 1:
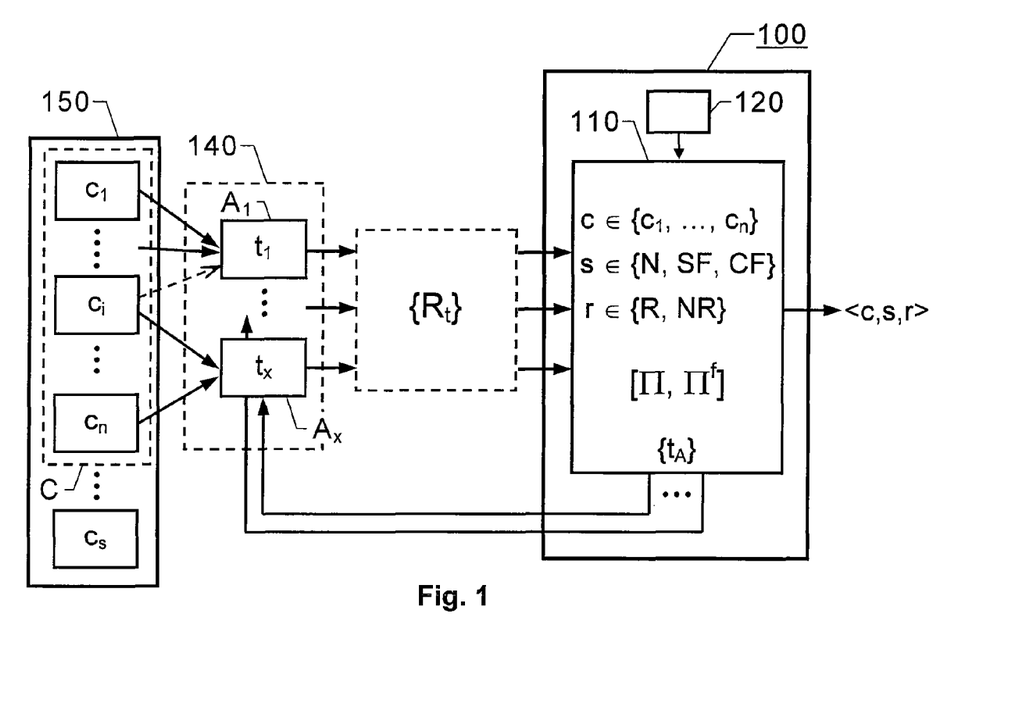
FIG. 1 shows a block diagram over a diagnosis engine according to one embodiment of the invention, FIG. 2 schematically depicts a motor vehicle equipped with the proposed diagnosis engine.

We refer initially to FIG. 1, which shows a block diagram over a diagnosis engine 100 according to one embodiment of the invention. The diagnosis engine 100 is adapted to, via a set of tests $(t_1, \ldots, t_x)$, estimate a status of an entity 150, which includes a set of components $c_1, \ldots, c_i, \ldots, c_n$, here collectively referred to as C. According to one embodiment of the invention, at least one test in the set of tests $t_1, \ldots, t_x$ is a multi-component test, which is adapted to simultaneously check a behavior of at least two of said components $c_1, \ldots, c_n$.

As will be discussed later, the diagnosis engine 100 may be implemented by means of a set of agents, or ECUs. Moreover, each component $c_1, \ldots, c_n$ is a unit or module that can be diagnosed. Consequently, in addition to components being directly connected to the agents (e.g. sensors and actuators), the concept also includes components being shared between the agents, for instance cables and pipes.

To reduce the complexity of the diagnosis engine 100, it may be preferable to only consider the abnormal mode, say denoted AB, and the not abnormal ¬AB mode, where the AB mode does not have a model. This means that the requirements for the so-called minimal diagnosis hypothesis are fulfilled according to the definition of de Kleer, J. et al., "Characterizing diagnoses", Artificial Intelligence, 56, 1992. Therefore, the notation used in the general diagnosis engine (GDE) can be employed. Here, we will study how the statuses of the components $c_1, \ldots, c_n$ and the readiness of these statuses are defined. The corresponding properties will be analyzed under the minimal diagnosis hypothesis.

A diagnosis is a set of components $D \subseteq C$, such that the components' abnormal behaviors, the remaining components' normal behaviors, the system description, and the observations are consistent. Since the minimal diagnosis hypothesis is fulfilled and D is a diagnosis, all supersets of D are also diagnoses. Further, a diagnosis D' is a minimal diagnosis if there is no proper subset $D \subset D'$ where D is a diagnosis.

An evaluation of a diagnostic test is said to result in a conflict meaning that at least one of the components $c_1, \ldots, c_n$ checked by the test must behave abnormally. Hence, a conflict is a set of components $\pi \subseteq C$, such that the components' normal behaviors, the system description, and the observations are inconsistent. A set of components set $D \subseteq C$ is a diagnosis if and only if it has a nonempty intersection with every conflict in a set of conflicts. Consequently, the set of minimal diagnoses is exactly determined by the set of minimal conflict.

A single-component diagnostic test generates a conflict $\pi=\{c\}$ if it detects that component c behaves abnormally. A more general multi-component test will generate a conflict $\pi \subseteq C$ if the test detects that one or more components in $\pi$ behaves abnormally. Naturally, if no abnormal behavior is detected, the test does not generate any conflicts.

According to the invention, each of the components $c_1, \ldots, c_n$ is assumed to have a particular health status s. This status may represent a normal N, a suspected faulty SF, or a confirmed faulty CF behavior of the component. The diagnosis engine 100 includes a processing unit 110, which is adapted to receive results $\{R_t\}$ of a set of tests $t_1, \ldots, t_x$ in respect of the components $c_1, \ldots, c_n$. Based on the test results $\{R_t\}$, the processing unit 110 is adapted to generate a status report <c,s,r> reflecting a functional quality of each of said components $c_1, \ldots, c_n$. For each of the components $c_1, \ldots, c_n$, the status report <c,s,r> indicates, explicitly or implicitly, the health status (i.e. whether the component c is normal N, suspected faulty SF or confirmed faulty CF). The process applied by the processing unit 110 when generating this report <c,s,r> will be explained in detail below.

Let us first assume that the diagnosis engine 100 operates in a centralized diagnostic system. Corresponding distributed solutions will be discussed below with reference to FIG. 2.

Definitions 1, 2 and 3 express when a component's health status is confirmed faulty CF, suspected faulty SF and normal N respectively.

Definition 1 Let D be the set of minimal diagnoses. The health status of a component c is confirmed faulty CF if and only if $\forall D \in D: c \in D$.

Definition 2 Let D be the set of minimal diagnoses. The health status of a component c is suspected faulty SF if and only if $\exists D_1, D_2 \in D: (c \in D_1 \wedge c \notin D_2)$.

Definition 3 Let D be the set of minimal diagnoses. The health status of a component c is normal N if and only if $\forall D \in D: c \notin D$.

Furthermore, the above list of possible health statuses for a component is exhaustive, i.e. the component is either confirmed faulty CF, suspected faulty SF or normal N. Thus, it can be deducted that when exclusively single-component diagnostic tests are employed, the tests may only result in the health statuses confirmed faulty CF and normal N for a component. However, when general diagnostic tests are introduced, these tests may result in that one or more components are assigned a suspected faulty SF health status.

EXAMPLE 1

Consider a system including a set of components A, B, C, D and E to be tested. Let there exist diagnostic tests, such that the set of possible conflicts is {A}, {B, C}, {C}, and {B, D}. If the present set of conflicts is {A} and {B, C}, then the corresponding set of minimal diagnoses for these conflicts is the set

D={{A, B}, {A, C}}.

The health status of component A is confirmed faulty CF, and the health statuses of components B and C are both suspected faulty SF. The remaining components D and E have normal N health statuses.

The health statuses confirmed faulty CF, suspected faulty SF, and normal N have been defined with respect to the set of minimal diagnoses. Traditionally, this would require that the set of minimal diagnoses be computed from the set of conflicts. However, it is more efficient to determine the health status of a component based on the set of conflicts as such. The following three Propositions present relations between the conflicts and the health statuses confirmed faulty CF, suspected faulty and normal N, such that a direct status determination can be made.

Proposition 1 Let D be a set of minimal diagnoses determined by the set of minimal conflicts Π. The health status of a component c is confirmed faulty CF if and only if $\exists \pi \in \Pi: \pi = \{c\}$.

Proposition 2 Let D be a set of minimal diagnoses determined by the set of minimal conflicts Π. The health status of a component c is suspected faulty SF if and only if $(\neg \exists \pi \in \Pi: \pi = \{c\}) \wedge \exists \pi \in \Pi: c \in \pi$.

Proposition 3 Let D be a set of minimal diagnoses determined by the set of minimal conflicts Π. The health status of a component c is normal N if and only if $\forall \pi \in \Pi: c \notin \pi$.

The proofs of the Propositions follow directly from the Definitions 1, 2 and 3 above. Thus, the Definitions 1, 2, and 3 may be used equally well as the conditions in the Propositions 1, 2 and 3 to derive a component's health status, i.e. to determine whether it is confirmed faulty CF, suspected faulty SF or normal N.

We have already briefly discussed the readiness status used in the invention. Below follows an in-depth discussion of this concept. If only single-component diagnostic tests are used, i.e. conflicts with only one component, then a component's status is ready if the diagnostic test that checks the component has been evaluated. However, in the general case where multi-component tests are used, there is no such simple relationship between the completion of a test and the readiness status.

With respect to readiness, the set D being the set of minimal diagnoses is consistent with the present minimal conflicts Π. The set of non-finished tests (or at least not yet evaluated tests) could in the future provide the set of conflicts $\Pi^f$. Let $\Pi \subseteq \Pi^f$ be a set of conflicts, and let the set $\overline{D}$ be the set of potential minimal diagnoses being consistent with the set of conflicts $\Pi \cup \overline{\Pi}$.

Definition 4 The readiness status of a component c is ready if and only if the health status of the component c is confirmed faulty CF, normal N or suspected faulty SF, considering the present diagnoses D, and for all future diagnoses $\overline{D}$, the health status of the component c is still confirmed faulty CF, normal N or suspected faulty SF respectively.

The readiness of a component is defined with respect to the diagnoses. Therefore, analogous to what has been described above, it is possible to instead calculate the readiness from the conflicts. For the confirmed faulty CF health status, the following simple relation holds.

Proposition 4 Let the health status of a component c be confirmed faulty CF, then the readiness status of the component c is ready.

Proof There exists a conflict $\pi = \{c\}$ since the health status of the component c is confirmed faulty CF, Proposition 1, and because π is always a minimal conflict, the health status is always confirmed faulty CF, and therefore the readiness status of the component c is ready.

The Proposition 4 shows that the definition of readiness here follows the intuitive meaning of faulty, i.e. if a component is confirmed to be faulty, then the component cannot (automatically) become non-faulty in the future.

Unfortunately, there are no such direct relationships between the health statuses normal N and suspected faulty SF, and the readiness status. This is shown by the following two propositions.

Proposition 5 Let $\Pi$ be the set of present minimal conflicts, let $\Pi^f$ be the set of all possible future conflicts, and let $\Pi \cup \Pi^f$. Let the health status of a component c be suspected faulty SF, then the readiness status of the component c is ready if and only if $$(\neg \exists \pi^f \epsilon \Pi^f : \pi^f = \{c\}) \wedge \quad (1a)$$

$$(\neg \exists \Pi, \bar{\pi} \epsilon \Pi, (\forall \pi \epsilon \Pi : c \epsilon \pi) : (c \not\in \bar{\pi} \wedge \subset \pi)) \quad (1b)$$

Proof The readiness status of the component c is ready if and only if its health status is neither normal N nor confirmed faulty CF for all $\Pi$. The status is not confirmed faulty CF exactly when (1a), Proposition 1. From Proposition 3 and considering minimal conflicts it follows that the health status is not normal N exactly when (1b). Since the health status cannot be normal N and not confirmed faulty CF for all future diagnoses, the health status is suspected faulty SF, and the readiness status is ready.

Even though it might at first seem difficult, due to the inclusion of the existential quantification, to use the Proposition 5 above, it is, in fact, straightforward to construct an algorithm that tests an equation, such as (2) below. Let us examine an example.

Example 2 Consider Example 1, where the set of conflicts is $\{\{A\}, \{B, C\}\}$, and the set of possible future conflicts is $\{\{C\}, \{B, D\}\}$, the health statuses of the components B and C are suspected faulty SF. For the future conflict $\pi^f = \{C\}$ and for the present conflict $\pi = \{B, C\}$, the condition in (1a) is not fulfilled. The readiness status of the component C is also not ready, since there exists a future conflict $\pi^f = \{C\}$, i.e. the condition in (1b) is not fulfilled.

Proposition 6 Let $\Pi$ be a set of present minimal conflicts, and let $\Pi^f$ be the set of all possible future conflicts. Let the health status of a component c be normal N, then the readiness status is ready if and only if $$(\neg \exists \pi^f \epsilon \Pi^f, (\forall \pi \epsilon \Pi : c \epsilon \pi^f \wedge \pi \not\subset \pi^f) \quad (2)$$

Proof The health status of the component c is normal N for all future diagnoses if and only if $c \not\in \pi^f$ for each minimal conflict $\pi^f \epsilon \Pi^f$. The health status is therefore normal N if and only if $c \not\in \pi^f$ or if each $\pi^f$, where $c \epsilon \pi^f$, is non-minimal considering the set $\Pi$, equivalent with (2). The health status is therefore always normal N, and therefore the readiness status is ready.

Example 3 Consider once again Example 1, where the health statuses of the components D and E are normal N. The readiness status of the component D is not ready, since there exists a possible future conflict $\pi^f = \{B, D\}$, which does not fulfill condition (2). The readiness status of the component E, on the other hand, is ready, since there does not exist any possible future conflict $\pi^f$ where the component E is in $\pi^f$.

In summary, the conditions in Proposition 4, 5 and 6 can be used to decide whether or not a component's readiness status is ready.

Returning now to FIG. 1, the processing unit 110 is adapted to associate a readiness status r with each of the components $c_1, \ldots, c_n$ based on the above-described conditions. The readiness status r for a particular component indicates a final value (i.e. ready R) if no additional testing of the component is expected to alter the component's present health status s; and conversely, if additional testing of the component may produce test results $\{R_t\}$ whose evaluation alter the component's present health status s, the processing unit 110 is adapted to assign a non-final value (i.e. not ready NR) to the component.

The processing unit 110 is also adapted to identify a set of present minimal conflicts $\Pi$ defining a set of health statuses s for the components $c_1, \ldots, c_n$ that explain the test results $\{R_t\}$.

Moreover, the processing unit 110 is adapted to derive a respective readiness status r for each of the components $c_1, \ldots, c_n$. Here, if at least one non-final readiness value NR is obtained, the processing unit 110 is further adapted to identify a set of future minimal conflicts $\Pi^f$ expressing all potential combinations of health statuses s for the $c_1, \ldots, c_n$ that are consistent with the set of present minimal conflicts $\Pi$.

Then, based on the sets of present and future minimal conflicts $\Pi$ and $\Pi^f$ respectively, the processing unit 110 is adapted to determine a set of additional tests $\{t_A\}$ in which each test is potentially capable of producing a result that causes the processing unit 110 to change the readiness status r for at least one of the components $c_1, \ldots, c_n$ from the non-final value NR to the final value R (i.e. from not ready to ready).

The processing unit 110 is also adapted to evaluate at least one test in the set of additional tests $\{t_A\}$, and thus generate a status report <c,s,r> of improved quality.

In FIG. 1, the set of additional tests $\{t_A\}$ is symbolized by means of feedback arrows to the tests set of tests $t_1, \ldots, t_x$. However, it is worth mentioning that, according to the invention, no extra tests may actually need be executed at this point in time. Instead, the relevant tests may already have been completed, and the additional testing merely involves evaluation in the processing unit 110 of one or more of these additional tests. Naturally, according to the invention, it is not excluded either that the set of additional tests $\{t_A\}$ involves performing one or more tests in addition to the tests originally performed.

It is advantageous if the status report <c,s,r> for each of the components $c_1, \ldots, c_n$, indicates whether the component's readiness status has a final or non-final value, R or NR respectively (i.e. whether its status is ready or not ready).

According to one embodiment of the invention, the processing unit 110 is adapted to evaluate different tests in the set of additional tests $\{t_A\}$ until a readiness status r with a final value R has been derived in respect to a desired number of the components $c_1, \ldots, c_n$.

The definition of what constitutes a meaningful additional test in the sense that the result of the test may alter at least one component's readiness status r is defined below.

Definition 5 A set $\{t_A\}$ of additional diagnostic tests is meaningful for a component c if the addition of their corresponding conflicts to the set of present conflicts would result in a change in the component's status.

From the definition follows that a component's readiness status r is ready if and only if no set of meaningful additional tests exists. Depending on whether the health status of a component is confirmed faulty CF, normal N or suspected faulty SF, different sets of additional tests are meaningful to evaluate.

Proposition 7 Let the health status of a component c be confirmed faulty CF, then there exists no meaningful additional sets of tests.

Proof Follows directly from Proposition 4.

Proposition 8 Let the health status of a component c be suspected faulty SF. The sets $\{t_A\}$ of meaningful additional tests for the component c are the sets of tests which correspond to the sets of conflicts $$\{\{\pi^f\}: \pi^f \epsilon \Pi^f, \pi^f = \{c\}\} \cup \quad (3a)$$

$$\{\Pi : \Pi \subseteq \Pi^f, \bar{\pi} \epsilon \Pi, (\forall \pi \epsilon \Pi : c \epsilon \pi) : (c \not\in \bar{\pi} \wedge \bar{\pi} \subset \pi)\} \quad (3b)$$

Proof Proposition 5 both provides tests that are meaningful in themselves, and sets of conflicts that are only meaningful if all tests in the set are evaluated. Equation (1a) corresponds to (3a) and (1b) to (3b). A conflict in a set in (3a) changes the health status suspected faulty SF to confirmed faulty CF. On the other hand, a set of conflicts in (3b) changes the health status suspected faulty SF to normal N.

Proposition 9 Let the health status of a component c be normal N, then the sets $\{t_A\}$ of meaningful additional tests are the sets that correspond to sets of conflicts $$\{\{\pi'\}: \pi' \in U', (\neg \exists \pi \in \Pi: (c \in \pi' \wedge \pi \subset \pi'))\} \quad (4)$$

Proof Proposition 3 gives (4).

After that the collection of sets of meaningful additional tests $\{t_A\}$ has been determined, for efficiency reasons, it is interesting to know in which order the sets of tests should be evaluated such that the readiness statuses r reach the final value R as quickly as possible. Preferably, the evaluation the tests in the set of additional tests $\{t_A\}$ is terminated whenever an acceptable status report <c,s,r> has been generated, e.g. when the readiness status for a desired number of components has been allocated the final value R. In many cases, the desired number of components represents all the tested components. In any case, all the additional tests $\{t_A\}$ need not necessarily be evaluated.

If the diagnostic system is interested in a component c for which it exists a test with a conflict $\pi = \{c\}$, then this test should probably be evaluated first, since this leads to a health status representing confirmed faulty CF and a status readiness r having the final value R.

If instead the health status for a component c is suspected faulty SF, then the ordering depends on if it is most important to find whether the health status is confirmed faulty CF, or if it is most important to return the normal N health status. If faulty status is prioritized, it is most efficient evaluate those tests that fastest lead to determination of a confirmed faulty CF status, i.e. tests corresponding to the conflicts in the set (3a). If, on the other hand, the normal N health status is prioritized, then tests corresponding to the conflicts in (3b) should be evaluated.

The proposed algorithm for determining the health status s and the readiness status r for each component c in a set of components C can be summarized by the expressions below.

Input: The set of present minimal conflicts $\Pi$ and the set of possible future conflicts $\Pi^f$.

Output: A set of tuples T.

1: $CF_\Pi$:=the set of conflicts in $\Pi$ where each conflict only includes a single component.
2: The set of confirmed faulty components is CF:=the set of components included in the set of conflicts $CF_\Pi$.
3: $SF_\Pi$:=the set of conflicts in $\Pi$ that is not in $CF_\Pi$.
4: The set of suspected faulty components is SF:=the set of components included in the set of conflicts $SF_\Pi$.
5: The set of normal components is N:=all components except those in CF or SF.
6: $\overline{S}_1^{\Pi^f}$:=the set of possible future conflicts $\Pi^f$, where each conflict only includes a single component.
7: $\overline{S}_1$:=the components included in the set of conflicts $\overline{S}_1^{\Pi^f}$.
8: $\overline{S}_2$:=Ø i.e. the empty set.
9: for all components c in SF except those in $\overline{S}_1$ do
10: if for all $\pi$ in the set of conflicts $\Pi$ where the component c included in $\pi$ there exists a conflict $\pi'$ in $\Pi^f$ such that c not in $\pi'$, and $\pi'$ is a subset of $\pi$ then
11: include c the set $\overline{S}_2$.
14: end if
15: end for
16: $\overline{N}^\Pi$:=conflicts in $\Pi^f$ where for all $\pi \in \Pi$, the component $c \in \pi'$ and $\pi' \in \Pi^f$, and the component $\pi$ is not a subset of $\pi'$.
17: R:=the components CF plus those in SF but not in $\overline{S}_1$ or $\overline{S}_2$ plus those in N except those in $\overline{N}$.

18: The set T:=includes for every component a tuple <c,s,r> where c denotes the component, s is confirmed faulty if c in CF, s is suspected faulty if c in SF and s is normal if c in N; r is ready if c in R and r is not ready otherwise.

Hence, for each component c, the tuple T (<c,s,r>) both specifies a health status of the component, and whether this status is ready or not. Using the above algorithm, Theorem 1 below provides such a tuple T for each component c.

Theorem 1 Let $\Pi$ be the set of present minimal conflicts and let $\Pi^f$ be the set of possible future conflicts.

For each component c, let the tuple for the component c be <c,s,r> where the health status for the component c is s in {confirmed faulty, suspected faulty, normal} and the readiness status is r in {ready, not-ready}. Let the result from the algorithm be T, then for each component c there exists a tuple $<c,s_T,r_T>$ in T where $<c,s_T,r_T> = <c,s,r>$.

Proof The correctness of CF, SF, and N follows from Propositions 1, 2 and 3 respectively. The sets $\overline{S}_1$, $\overline{S}_2$ and $\overline{N}$ correspond to (1a), (1b) and (2) respectively in Proposition 5 and 6. R is therefore the set of components whose readiness statuses r have the final value (ready). The output T is therefore correct.

If the diagnostic system in which the diagnosis engine 100 is included utilizes DTCs, it is normally preferable to set an error code for a component whenever the component is assigned a confirmed faulty status CF or a suspected faulty status SF. It is further advantageous to include the above-described status report <c,s,r>, or tuple T, in the DTC.

Figure 2:
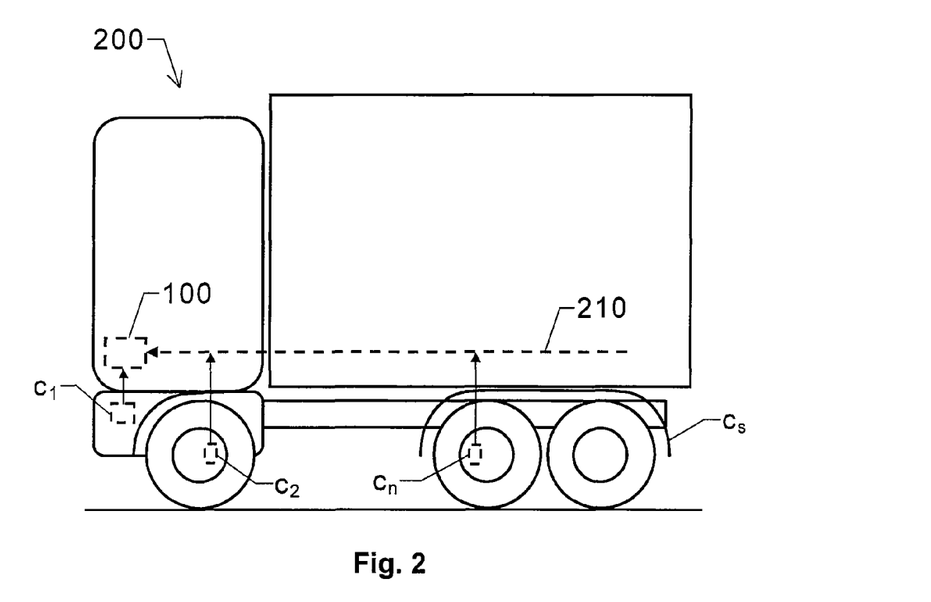

FIG. 2 schematically depicts a motor vehicle 200 being equipped with the proposed diagnosis engine 100. Specifically, the vehicle 200 includes a number of components $c_1$, $c_2$, ..., $c_n$, ..., $c_s$ and a diagnosis system, which is adapted to estimate the functional qualities of at least a sub-group of the vehicle's 200 components, say $c_1, \ldots, c_n$. The diagnosis engine 100, in turn, is included in the diagnosis system. A modern heavy vehicle, such as a truck, may include 20 to 30 ECUs, and the number of components associated with one ECU may typically range from 4 to around 100. Preferably, the diagnosis engine 100 is implemented in one ECU and test results in respect of one or more of the components in said sub-group $c_1, \ldots, c_n$ may be delivered to the diagnosis engine 100 via a data bus 210 (shown in FIG. 1 as 120), e.g. adapted to the CAN format (CAN=Controller Area Network). However, the data bus 210 (shown in FIG. 1 as 120) may equally well be adapted to any other standard, such as Time Triggered CAN (TTCAN), FlexRay, Media Oriented System Transport (MOST) of Byteflight. The standards all represent efficient means of accomplishing networks in trucks, busses and other motor vehicles. B interconnecting various control units of a vehicle via a network, a very large number of vehicle functions may be accomplished based on relatively few ECUs. Namely, by combining resources from two or more ECUs a flexible and cost efficient over-all vehicular design is obtained.

The test results may equally well be generated in an ECU being common to an ECU in which the proposed diagnosis engine is implemented. Naturally, in such a case, the test results do not need to be sent via an external data bus. Nevertheless, according to one embodiment of the invention, the processing unit 110 is adapted to receive the test results $\{R_t\}$ via at least one testing agent 140 being associated with the entity 150 (FIG. 1), or the vehicle 200 (FIG. 2).

We will now exemplify distributed diagnostic systems by means of an example. Then, a framework for distributed systems will be presented, and the health statuses confirmed faulty CF, normal N and suspected faulty SF as well as the readiness status will be extended to distributed systems.

Let us assume that a system includes a set of components C, which should be supervised by a diagnostic system implemented in a set of agents A. A local diagnosis is here determined by the conflicts in a single agent, while a global diagnosis is determined by all agents' conflicts together.

Example FIG. 1 shows a layout of agents $A_1, \ldots, A_x$ and components $c_1, \ldots, c_n$, for instance in the form of sensors. Here, a component $c_1$ is physically connected to a first agent $A_1$, while components $c_1$ and $c_n$ are physically connected to a second agent $A_x$. In this case, the diagnostic test $t_1$ checks the consistent behavior of the components $c_1$ and $c_i$. To this aim, the diagnostic test $t_1$ in agent $A_1$ collects the value of the component $c_i$, over a network (not shown) being common to the agents $A_1$ and $A_x$, and uses this value to check the consistency of the components $c_1$ and $c_i$.

Below follows a discussion in which the health and readiness statuses are extended to distributed systems of the type exemplified above.

Let $\Pi^A$ be the set of minimal conflicts detected in agent $A \in \mathcal{A}$, and let $\mathbb{D}^A$ be the set of local minimal diagnoses determined by the set of minimal conflicts $\Pi^A$. Further, let D be the set of minimal global diagnoses determined by the set of conflicts $\cup_{A \in \mathcal{A}} \Pi^A$. A component's health status can, in a distributed system, be divided into two different levels, namely the global level and the local level respectively.

Definition 6 The global status (GS) of a component c is confirmed faulty CF, suspected faulty SF or normal N if it is confirmed faulty CF, suspected faulty SF or normal N respectively with regard to the global minimal diagnoses D.

Definition 7 The local status (LS) of component c is confirmed faulty CF, suspected faulty SF or normal N for agent A if it is confirmed faulty CF, suspected faulty SF or normal N respectively with regard to the local minimal diagnoses $\mathbb{D}^A$.

The GS and the LS of the component c is either normal N, suspected faulty SF, or confirmed faulty CF, i.e. exhaustive. The GS has a simple relation to the LS in at least one agent where the LS is confirmed faulty CF.

Proposition 10 The GS of a component c is confirmed faulty CF if and only if the LS is confirmed faulty CF in at least one agent.

Proof The GS of the component c is confirmed faulty CF if and only if there exists a conflict $\pi=\{c\}$, and such a conflict exists if and only if the LS of the component c is confirmed faulty CF for at least one agent, Proposition 1.

The proposition 10 shows that the definition of globally confirmed faulty CF follows the intuitive meaning of confirmed faulty CF. If the LS of a particular component c is confirmed faulty CF, then the component's c GS must also be confirmed faulty CF.

Nevertheless, the relation between GS suspected faulty SF and the local status is not equally simple.

Proposition 11 The GS of a component c is suspected faulty if and only if $(\neg \exists A \in \mathcal{A} : (\text{the LS of the component c is CF in A}))\wedge$ (5a)

$(\exists A \in \mathcal{A} : (\text{the LS of the component c is SF in A})\wedge$ (5b)

$(\exists \pi \in \Pi^A; \forall \tilde{A} \in \mathcal{A}, \forall \tilde{\pi} \in \Pi^{\tilde{A}}: (c \in \pi \wedge \tilde{\pi} \not\subset \pi))))$ (5c)

Proof The GS of the component c is suspected faulty SF if and only if there exists a minimal conflict $\pi$ such that $c \in \pi$ and the LS of the component c is not confirmed faulty CF for any agent, i.e. (5a). For an agent e where the LS of the component c is suspected faulty SF, i.e. (5b), there exists a minimal conflict $\pi$, considering the set of conflicts $\cup_{A \in \mathcal{A}} \Pi^A$, such that $c \in \pi$ exactly when (5c). From this follows that the GS of the component c is suspected faulty SF.

An implication of Proposition 11 is that the GS of the component c is suspected faulty SF if the LS is suspected faulty SF for all agents and only if the LS is suspected faulty SF for at least one agent. The relation between GS normal N and the LS is shown by the following proposition.

Proposition 12 The GS of a component c is normal N if and only if $\forall A \in \mathcal{A} : ((\text{the LS of the component c is N in A}) \vee$ (6a)

$((\text{the LS of the component c is SF in A})\wedge$ (6b)

$(\neg \exists \pi \in \Pi^A, \forall \tilde{A} \in \mathcal{A}, \forall \tilde{\pi} \in \Pi^{\tilde{A}} : (c \in \pi \wedge \tilde{\pi} \not\subset \pi))))$ (6c)

Proof The GS of the component c is normal N if and only if the component c is not included in any minimal conflict, Proposition 3. The LS is therefore normal N, i.e. (6a), or suspected faulty SF, i.e. (6b), for all agents. In an agent A where the LS is suspected faulty SF, the conflicts including the component c will be non-minimal considering the complete set of minimal conflicts exactly when (6c). Therefore the component c is not included in any minimal conflict in the complete set of minimal conflicts, i.e. the GS of the component c is normal N.

An implication of Proposition 12 is that the GS of a component c is normal if the LS is normal N for all agents.

Example 5 A system consists of two agents $A_1$ and $A_2$ which have calculated the sets of minimal conflicts $\Pi^{A_1}=\{\{A, B\}\}$ and $\Pi^{A_2}=\{\{A\}, \{C, D\}\}$. The sets of minimal local diagnoses determined by the sets of conflicts are $\mathbb{D}^{A_1}=\{\{A\}, \{B\}\}$ and $\mathbb{D}^{A_2}=\{\{A, C\}, \{A, D\}\}$. The LS of components A and B is suspected faulty SF in agent $A_1$, while the LS of component A is confirmed faulty CF and the LS of C and D is suspected faulty SF in $A_2$.

Proposition 10 gives that the GS of the component A is confirmed faulty CF, since there exists an LS where the component A is confirmed faulty CF. The GS of B is normal N, since the LS of the component B is normal N in $A_2$, i.e. (6a), and it is both suspected faulty SF in $A_1$, i.e. (6b), and there exists no conflict $\pi \in \Pi^{A_1}$ such that $\{A\} \not\subset \pi$, i.e. (6c). The GS of components C and D is suspected faulty SF, since they are suspected faulty SF and the conflict $\{A, B\} \not\subset \{C, D\}$. The set of global diagnoses is $\mathcal{D}=\{\{A, C\}, \{A, D\}\}$, which verifies the statuses.

In summary, the conditions in Propositions 10, 11, and 12 can be used to decide if a component's GS is confirmed faulty CF, suspected faulty SF or normal N.

Below, the previously discussed definition of the readiness status r is extended to global and local readiness statuses.

Definition 8 The status of a component c is globally ready if it is ready with respect to the set of present and future global minimal diagnoses $\mathcal{D}$.

Definition 9 The status of a component c is locally ready for agent A if it is ready with respect to the set of present and future local minimal diagnoses $\mathbb{D}^A$.

Since components can be shared between agents, a component may be locally ready even though it is not globally ready, and vice versa. The relations between globally ready and locally ready are shown by the three propositions below.

The strong relationship between the confirmed faulty CF status and status' readiness shown in Proposition 4 also holds for global readiness, as shown by the following proposition.

Proposition 13 Let the GS of a component c be confirmed faulty CF, then it is globally ready.

Proof If the GS of the component c is confirmed faulty CF, then the LS of the component c is confirmed faulty CF for at least one agent, and it is therefore locally ready for at least one agent, Proposition 4. Since the component c is locally ready, the LS is confirmed faulty CF for all future diagnoses and therefore the GS is also confirmed faulty CF for all future diagnoses, i.e. it is globally ready.

The relationship between global readiness and the GS is not as simple when the GS is suspected faulty SF or normal N as is shown by the following two propositions.

Proposition 14 Let the GS of a component c be suspected faulty SF, then it is globally ready if and only if $$(\neg \exists \pi^f \epsilon \Pi^f, \exists A \epsilon \mathcal{A}_c: \text{(LS of the component c is CF in A)}) \land \quad (7a)$$

$$(\neg \exists \Pi \subseteq \Pi^f: (\forall A \epsilon \{A: \text{LS of the component c is SF in A}\}, \quad (7b)$$

$$\forall \pi \epsilon \Pi^A, \exists \bar{\pi} \epsilon \Pi: (c \epsilon \pi \land \bar{\pi} \subset \pi)))$$

Proof The GS of the component c is suspected faulty SF and globally ready if and only if the GS is neither confirmed faulty CF nor normal N for any future conflicts. The component c is not confirmed faulty CF exactly when (7a), Proposition 10. The GS is normal N exactly when (7b), Proposition 12. Therefore the component c is globally ready if and only if (7) is fulfilled.

Proposition 15 Let $\Pi^f$ be the set of possible future conflicts. Let the GS of a component c be normal N, then it is globally ready if and only if $$\neg \exists \pi^f \epsilon \Pi^f: ((\exists A \epsilon \mathcal{A}_c: \text{(LS of the component c is CF)}) \lor \quad (8)$$

$$(\exists A \epsilon \mathcal{A}_c, \forall A \epsilon \mathcal{A}_c, \forall \bar{\pi}. \epsilon \Pi \mathcal{A}_c: \text{(LS of the component c is SF in A)}))$$

Proof The GS of the component c is normal N if and only if it no conflict exists such that the GS becomes confirmed faulty CF or suspected faulty SF. This is equivalent to $$\neg \exists \pi^f \epsilon \Pi^f: ((\exists A : \text{LS of the component c is CF for A}),$$

Proposition 10, and that $$\neg \exists \pi^f \epsilon \Pi^f: (\forall A : \text{(LS of c is CF for A)}) \land$$

$$(\exists A: ((\text{LS of c is SF in A}) \land (\forall \tilde{A}, \forall \bar{\pi}: (c \epsilon \pi^f \land \bar{\pi} \not\subset \pi^f))))),$$

Proposition 11, which is equivalent with (8). Therefore the component c is globally ready if and only if (8) is fulfilled.

In summary, the conditions in Propositions 13, 14, and 15 can be used to decide if a component's GS is ready.

Figure 3:
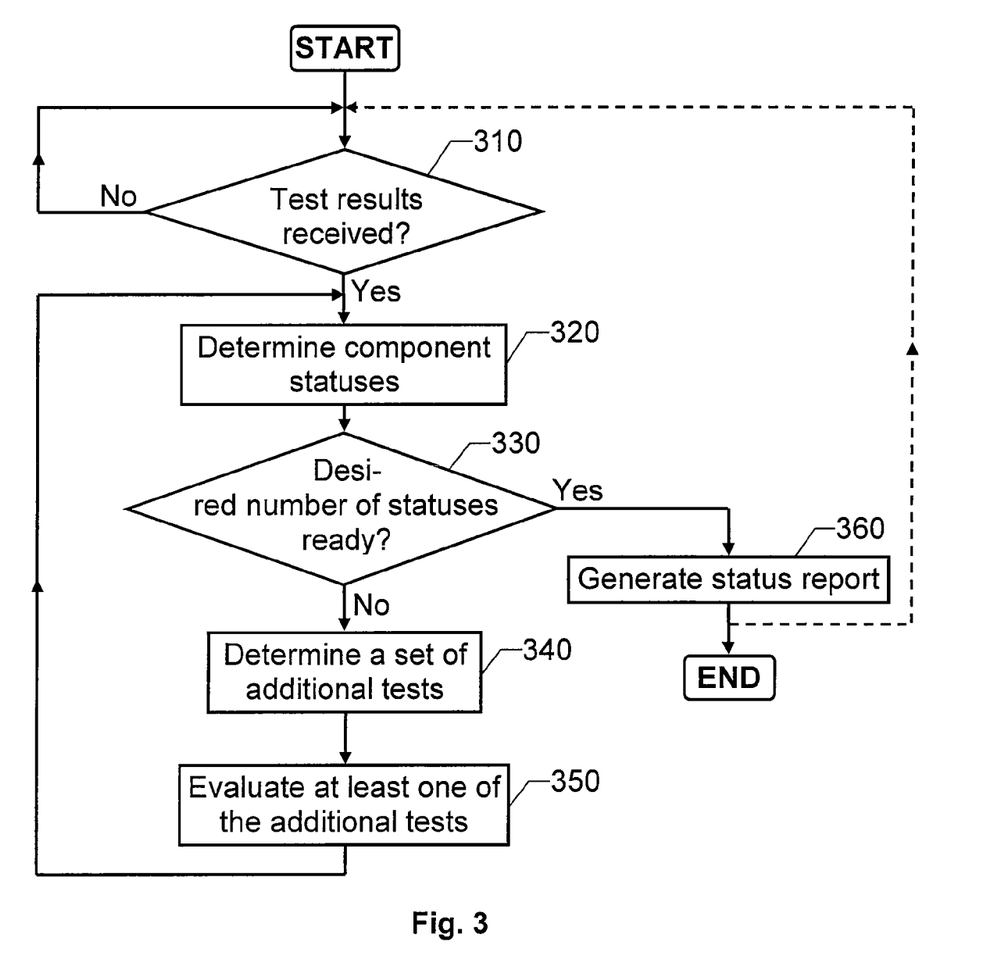
FIG. 3 shows a flow diagram illustrating the general method according to the invention.

Moreover, the set of meaningful additional tests $\{t_A\}$ can be calculated by following the same procedure as described above in respect of a centralized diagnostic system In order to sum up, the general method of diagnosing an entity including a plurality of components according to the invention will be described below with reference to the flow diagram in FIG. 3.

A first step 310 checks whether any test results to be evaluated have been received. If so, a step 320 follows. Otherwise, the procedure loops back and stays in the step 310. The step 320 determines a health status and a readiness status for each of the components. The health status represents either a normal, a suspected faulty or a confirmed faulty behavior of the component. The readiness status is associated with each component; such that the readiness status indicates a final value for the component if no additional testing of the component is expected to alter the component's present health status, and the readiness status indicates a non-final value if additional testing of the component may produce a test result whose evaluation alters the component's present health status. Determining the readiness statuses involves identifying a set of present minimal conflicts that define a set of health statuses for the components, and thus explain the test results.

A step 330, subsequent to the step 320, investigates whether or not a desired number of components have a readiness status being ready, i.e. have been assigned the final value.

If this is found to be the case, the procedure jumps to a step 360. Otherwise, a step 340 follows, which determines a set of additional tests that are meaningful in the sense that each test in the set is potentially capable of producing a result whose evaluation causes the readiness status for at least one of the components to change from the non-final value to the final value, i.e. become ready. Determining the set of additional tests involves identifying a set of future minimal conflicts that express all potential combinations of health statuses for the components, which are consistent with the set of present minimal conflicts.

Then, a step 350 evaluates at least one of the tests in the set of additional tests. Thereafter, the procedure loops back to the step 320 for a renewed determination of the components' statuses.

The step 360 generates a status report, which reflects a functional quality of each of the tested components. Specifically, the status report indicates the components' health statuses (normal, suspected faulty or confirmed faulty), and whether or not this status has attained a final value. After the step 360, the procedure may either end, or loop back to the step 310 awaiting new test results.

All of the process steps, as well as any sub-sequence of steps, described with reference to the FIG. 3 above may be controlled by means of at least one programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

The invention claimed is:

1. A computer apparatus for estimating a status of an entity (150, 200) with a plurality of components ($c_1, \ldots, c_n$) which each is assumed to have a health status (s), the computer apparatus comprising:

a processing unit (110) adapted to receive results ($\{R_t\}$) of a set of tests ($t_1, \ldots, t_x$) in respect of the components ($c_1, \ldots, c_n$), and based thereon generate a status report (<c,s,r>) reflecting a functional quality of each of said components ($c_1, \ldots, c_n$), wherein the status report (<c,s,r>) indicates the health status (s) in the form of a parameter expressing whether the component is normal (N), suspected faulty (SF) or confirmed faulty (CF), the processing unit (110) is adapted to associate a readiness status (r) with each of said components ($c_1, \ldots, c_n$), the readiness status (r) for a component indicating a final value (R) if no additional testing of the component is expected to alter the component's present health status (s), and indicating a non-final value (NR) if additional testing of the component may produce test results ($\{R_t\}$) altering the component's present health status (s), the processing unit (110) is adapted to, based on the received test results ($\{R_t\}$):

identify a set of present minimal conflicts (Π) defining a set of health statuses (s) for said components ($c_1, \ldots, c_n$) explaining the test results ($\{R_t\}$), derive a respective readiness status (r) for each of said components ($c_1, \ldots, c_n$), and in case of at least one non-final value (NR), identify a set of future minimal conflicts ($\Pi^f$) expressing all potential combinations of health statuses (s) for said components ($c_1, \ldots, c_n$) being consistent with the set of present minimal conflicts (Π), determine, based on the sets of present and future minimal conflicts ($\Pi; \Pi^f$), a set of additional tests ($\{t_A\}$) in which each test is potentially capable of producing a result that causes the processing unit (110) to change the readiness status (r) for at least one of said components ($c_1, \ldots, c_n$) from the non-final value (NR) to the final value (R), and evaluate at least one test in the set of additional tests ($\{t_A\}$).

2. The computer apparatus according to claim 1, wherein the processing unit (110) is adapted to evaluate different tests in the set of additional tests ($\{t_A\}$) until a readiness status (r) with a final value (R) has been derived in respect of a desired number of said components ($c_1, \ldots, c_n$).

3. The computer apparatus according to claim 1, wherein the processing unit (110) is adapted to receive the test results ($\{R_t\}$) via at least two testing agents ($A_1, A_x$) associated with the entity (150, 200), and the at least two testing agents ($A_1, A_x$) are included in a distributed testing system for the entity (150, 200).

4. The computer apparatus according to claim 1, wherein at least one test in the set of tests ($t_1, \ldots, t_x$) is a multi-component test adapted to simultaneously check a behavior of at least two of said components ($c_1, \ldots, c_n$).

5. A motor vehicle (200) consisting of a plurality of components ($c_1, \ldots, c_n, \ldots, c_s$) and a diagnosis system adapted to estimate functional qualities of at least a sub-group ($c_1, \ldots, c_n$) of said components, wherein the diagnosis system estimates a status of an entity (150, 200) with a plurality of components ($c_1, \ldots, c_n$) which each is assumed to have a health status (s), the diagnosis system comprising:

a processing unit (110) adapted to receive results ($\{R_t\}$) of a set of tests ($t_1, \ldots, t_x$) in respect of the components ($c_1, \ldots, c_n$), and based thereon generate a status report ($<c,s,r>$) reflecting a functional quality of each of said components ($c_1, \ldots, c_n$), wherein the status report ($<c,s,r>$) indicates the health status (s) in the form of a parameter expressing whether the component is normal (N), suspected faulty (SF) or confirmed faulty (CF), the processing unit (110) is adapted to associate a readiness status (r) with each of said components ($c_1, \ldots, c_n$), the readiness status (r) for a component indicating a final value (R) if no additional testing of the component is expected to alter the component's present health status (s), and indicating a non-final value (NR) if additional testing of the component may produce test results ($\{R_t\}$) altering the component's present health status (s), the processing unit (110) is adapted to, based on the received test results ($\{R_t\}$):

identify a set of present minimal conflicts (Π) defining a set of health statuses (s) for said components ($c_1, \ldots, c_n$) explaining the test results ($\{R_t\}$), derive a respective readiness status (r) for each of said components ($c_1, \ldots, c_n$), and in case of at least one non-final value (NR), identify a set of future minimal conflicts ($\Pi^f$) expressing all potential combinations of health statuses (s) for said components ($c_1, \ldots, c_n$) being consistent with the set of present minimal conflicts (Π), determine, based on the sets of present and future minimal conflicts ($\Pi; \Pi^f$), a set of additional tests ($\{t_A\}$) in which each test is potentially capable of producing a result that causes the processing unit (110) to change the readiness status (r) for at least one of said components ($c_1, \ldots, c_n$) from the non-final value (NR) to the final value (R), and evaluate at least one test in the set of additional tests ($\{t_A\}$).

6. A method of estimating a status of an entity (150, 200) with a plurality of components ($c_1, \ldots, c_n$) which each is assumed to have a health status (s), the method comprising receiving results ($\{R_t\}$) of a set of tests ($t_1, \ldots, t_x$) in respect of the components ($c_1, \ldots, c_n$), and based thereon generating a status report ($<c,s,r>$) reflecting a functional quality of each of said components ($c_1, \ldots, c_n$), wherein the status report ($<c,s,r>$) indicates the health status (s) in the form of a parameter expressing whether the component is normal (N), suspected faulty (SF) or confirmed faulty (CF), and the method comprising operation of the following elements on a processing unit (110):

associating a readiness status (r) with each of said components ($c_1, \ldots, c_n$) using the processing unit, the readiness status (r) for a component indicating a final value (R) if no additional testing of the component is expected to alter the component's present health status (s), and indicating a non-final value (NR) if additional testing of the component may produce test results ($\{R_t\}$) altering the component's present health status (s), the method further comprising, based the received test results ($\{R_t\}$), identifying via the processing unit a set of present minimal conflicts (Π) defining a set of health statuses (s) for said components ($c_1, \ldots, c_n$) explaining the test results ($\{R_t\}$), deriving via the processing unit a respective readiness status (r) for each of said components ($c_1, \ldots, c_n$), and in case of at least one non-final value (NR), identifying via the processing unit a set of future minimal conflicts ($\Pi^f$) expressing all potential combinations of health statuses for said components ($c_1, \ldots, c_n$) being consistent with the set of present minimal conflicts (H), determining via the processing unit, based on the sets of present and future minimal conflicts ($\Pi; \Pi^f$), a set of additional tests ($\{t_A\}$) in which each test is potentially capable of producing a result that causing the readiness status (r) for at least one of said components ($c_1, \ldots, c_n$) to be changed from the non-final value (NR) to the final value (R), and evaluating via the processing unit at least one test in the set of additional tests ($\{t_A\}$).

7. The method according to claim 6, comprising evaluating different tests in the set of additional tests ($\{t_A\}$) until a readiness status (r) with a final value (R) has been derived in respect of a desired number of said components ($c_1, \ldots, c_n$).

8. The method according to claim 6, wherein at least one test in the set of tests ($t_1, \ldots, t_x$) is a multi-component test adapted to simultaneously check a behavior of at least two of said components ($c_1, \ldots, c_n$).

9. A computer program product comprising computer-readable storage medium, the computer-readable storage medium comprising computer-executable program code stored therein, the computer-executable program code configured for estimating a status of an entity (150, 200) with a plurality of components ($c_1, \ldots, c_n$) which each is assumed to have a health status (s), the method comprising receiving results ($\{R_t\}$) of a set of tests ($t_1, \ldots, t_x$) in respect of the components ($c_1, \ldots, c_n$), and based thereon generating a status report ($<c,s,r>$) reflecting a functional quality of each of said components ($c_1, \ldots, c_n$), wherein the status report ($<c,s,r>$) indicates the health status (s) in the form of a parameter expressing whether the component is normal (N), suspected faulty (SF) or confirmed faulty (CF), and the computer-executable program code comprising:

a first executable portion configured to associate a readiness status (r) with each of said components ($c_1, \ldots, c_n$), the readiness status (r) for a component indicating a final value (R) if no additional testing of the component is expected to alter the component's present health status (s), and indicating a non-final value (NR) if additional testing of the component may produce test results ($\{R_t\}$) altering the component's present health status (s), the computer-executable program code further comprising, based the received test results ($\{R_t\}$):

a second executable portion configured to identify a set of present minimal conflicts ($\Pi$) defining a set of health statuses (s) for said components ($c_1, \ldots, c_n$) explaining the test results ($\{R_t\}$), a third executable portion configured to derive a respective readiness status (r) for each of said components ($c_1, \ldots, c_n$), and in case of at least one non-final value (NR), a fourth executable portion configured to identify a set of future minimal conflicts ($\Pi^f$) expressing all potential combinations of health statuses for said components ($c_1, \ldots, c_n$) being consistent with the set of present minimal conflicts ($\Pi$), a fifth executable portion configured to determine, based on the sets of present and future minimal conflicts ($\Pi$; $\Pi^f$), a set of additional tests ($\{t_A\}$) in which each test is potentially capable of producing a result that causing the readiness status (r) for at least one of said components ($c_1, \ldots, c_n$) to be changed from the non-final value (NR) to the final value (R), and a sixth executable portion configured to evaluate at least one test in the set of additional tests ($\{t_A\}$).

10. The computer program product according to claim 9, wherein said computer-executable program code further comprises:

a seventh executable portion configure to evaluate different tests in the set of additional tests ($\{t_A\}$) until a readiness status (r) with a final value (R) has been derived in respect of a desired number of said components ($c_1, \ldots, c_n$).

11. The computer program product according to claim 9, wherein at least one test in the set of tests ($t_1, \ldots, t_x$) is a multi-component test adapted to simultaneously check a behavior of at least two of said components ($c_1, \ldots, c_n$).

12. A computer readable storage medium (160) comprising computer-executable program code stored therein, the computer-executable program code configured for estimating a status of an entity (150, 200) with a plurality of components ($c_1, \ldots, c_n$) which each is assumed to have a health status (s), the method comprising receiving results ($\{R_t\}$) of a set of tests ($t_1, \ldots, t_x$) in respect of the components ($c_1, \ldots, c_n$), and based thereon generating a status report ($<c,s,r>$) reflecting a functional quality of each of said components ($c_1, \ldots, c_n$), wherein the status report ($<c,s,r>$) indicates the health status (s) in the form of a parameter expressing whether the component is normal (N), suspected faulty (SF) or confirmed faulty (CF), and the computer-executable program code comprising:

a first executable portion configured to associate a readiness status (r) with each of said components ($c_1, \ldots, c_n$), the readiness status (r) for a component indicating a final value (R) if no additional testing of the component is expected to alter the component's present health status (s), and indicating a non-final value (NR) if additional testing of the component may produce test results ($\{R_t\}$) altering the component's present health status (s), the computer-executable program code further comprising, based the received test results ($\{R_t\}$):

a second executable portion configured to identify a set of present minimal conflicts ($\Pi$) defining a set of health statuses (s) for said components ($c_1, \ldots, c_n$) explaining the test results ($\{R_t\}$), a third executable portion configured to derive a respective readiness status (r) for each of said components ($c_1, \ldots, c_n$), and in case of at least one non-final value (NR), a fourth executable portion configured to identify a set of future minimal conflicts ($\Pi^f$) expressing all potential combinations of health statuses for said components ($c_1, \ldots, c_n$) being consistent with the set of present minimal conflicts ($\Pi$), a fifth executable portion configured to determine, based on the sets of present and future minimal conflicts ($\Pi$; $\Pi^f$), a set of additional tests ($\{t_A\}$) in which each test is potentially capable of producing a result that causing the readiness status (r) for at least one of said components ($c_1, \ldots, c_n$) to be changed from the non-final value (NR) to the final value (R), and a sixth executable portion configured to evaluate at least one test in the set of additional tests ($\{t_A\}$).

13. The computer readable medium according to claim 12, wherein said, computer-executable program code further comprises:

a seventh executable portion configure to evaluate different tests in the set of additional tests ($\{t_A\}$) until a readiness status (r) with a final value (R) has been derived in respect of a desired number of said components ($c_1, \ldots, c_n$).

14. The computer readable medium according to claim 12, wherein, wherein at least one test in the set of tests ($t_1, \ldots, t_x$) is a multi-component test adapted to simultaneously check a behavior of at least two of said components ($c_1, \ldots, c_n$).

* * * * *

UNITED STATES PATENT AND TRADEMARK OFFICE
CERTIFICATE OF CORRECTION

| | |
|---|---|
| PATENT NO. | : 7,809,986 B2 |
| APPLICATION NO. | : 11/765132 |
| DATED | : October 5, 2010 |
| INVENTOR(S) | : Mattias Nyberg et al. |

It is certified that error appears in the above-identified patent and that said Letters Patent is hereby corrected as shown below:

Column 16, Line 52, in Claim 6, please delete "(H)" and replace with --(Π)--

Signed and Sealed this

Thirtieth Day of November, 2010

David J. Kappos
*Director of the United States Patent and Trademark Office*